March 31, 1953
A. S. BERG ET AL
2,632,942
METHOD OF JOINING TOGETHER GLASS PIPE SECTIONS
Filed Feb. 7, 1950
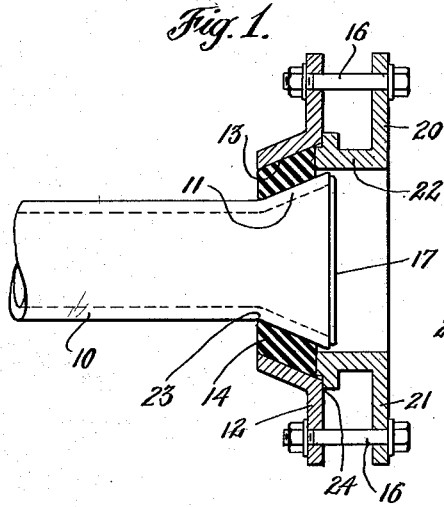
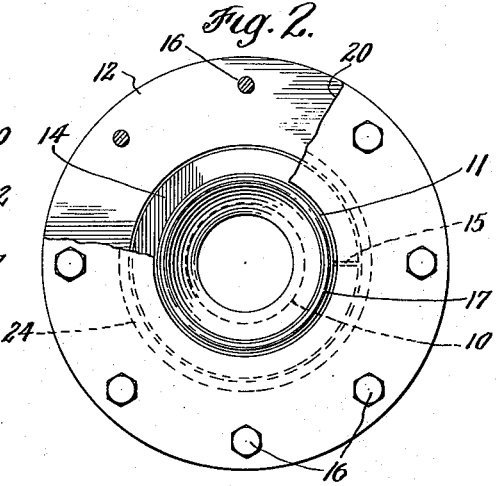
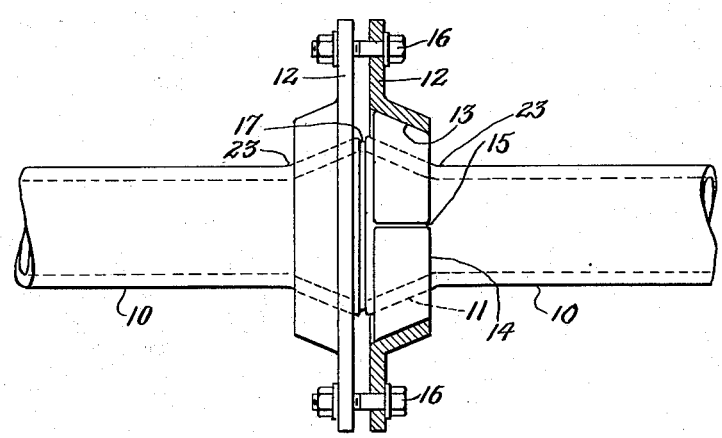
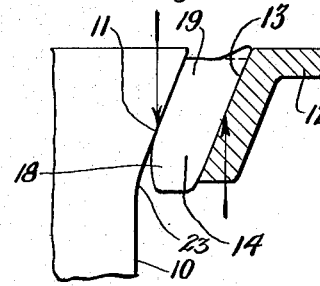
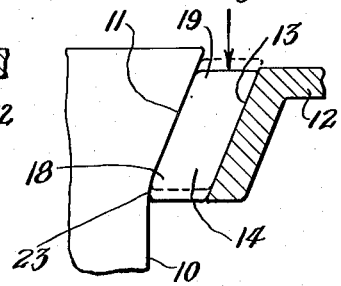
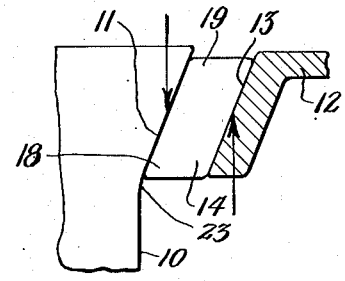
INVENTORS
ABRAM S. BERG
ARSENIUS N. GOREGLIAD
BY
Woodcock and Phelan
ATTORNEYS Patented Mar. 31, 1953

2,632,942

UNITED STATES PATENT OFFICE 2,632,942

METHOD OF JOINING TOGETHER GLASS PIPE SECTIONS

Abram S. Berg and Arsenius N. Goregliad, Wyncote, Pa.

Application February 7, 1950, Serial No. 142,842

1 Claim. (Cl. 29—148.2)

This invention relates to pipe fitting and it relates particularly to the interconnection of sections of prefabricated glass pipe having specially formed outward flares at each end to facilitate connection thereof. The principal object of the invention is to prevent stressing the flares in such a way as to cause breakage thereof either while the pipe sections are being connected by applying to the glass flares the force necessary to prevent leakage at the pipe joints, or thereafter due to vibration, shock, or the expansion and contraction of various parts of the system. This object is achieved by the novel application to each flare of an insert which heretofore has caused much breakage of glass pipe due to its improper application.

It has heretofore been customary to connect two sections of glass pipe by butting the flared ends thereof together with a suitable gasket between the ends. The two sections of pipe are then drawn together endwise with sufficient force to prevent leakage around the gasket. For this purpose flanged metal collars, commonly called flanges, have been placed on each section of pipe and drawn together by bolts with the flanges exerting force on the glass flares to draw them together.

In forming a pipe line by thus connecting together individual sections of pipe, it is necessary that each section have a flare on each end thereof. In order that a flange may be placed on this kind of pipe section it is necessary that the flange either be made in two pieces or, if it is made in one annular piece, that the opening therein be large enough to pass over the outwardly flared end of the pipe section, and it then becomes necessary to fill up in some way the space between the glass flare and the larger flange in order that the flange may transmit force to the flare.

The latter arrangement has proven most satisfactory in practice and flexible inserts have been devised to be wrapped around the glass flares after the flanges have been placed on the pipe sections thereby to transmit force from flange to flare when the pipe sections are drawn together endwise by tightening bolts extending through adjacent flanges. Furthermore these inserts form cushions between pipe sections to minimize breakage thereof. Considerable breakage of pipe has occurred, however, and this has been objectionable not only because the usual hard-glass pipe is expensive and its breakage wasteful, but also because serious damage may occur from leaking chemicals. There may be serious loss of time during which the system, or possibly a whole chemical plant, may be inoperative because of one broken pipe section.

Attempts to reduce breakage of glass pipe heretofore have resulted in the standardization of its dimensions with particularly close tolerances being held on the outside of the flares. Likewise the inner faces of the flanges are very accurately machined to conform in their taper to the outside of the flare. Also the flexible inserts which are interposed between the flanges and the flares are made with great accuracy to standardized dimensions. A difficulty has arisen, however, due primarily to the necessity of utilizing for application of mechanical force the whole length of the flare since unnecessary length thereof would be expensive and the joints would be objectionably bulky where the pipe is installed in close quarters. Accordingly the width of the flexible inserts has been made substantially equal to the full length of the flare.

The proper insertion of one of these full-size inserts between the flare and the flange has been difficult because, on the one hand, if the insert is not almost fully inserted its projecting portions interfere with the proper functioning of the gasket interposed between abutting ends of the pipe sections. It is then necessary to tighten unduly the bolts that draw the flanges together to prevent leakage so that breakage frequently occurs due to the increased force applied to the flares.

On the other hand, when full insertion of the insert has been accomplished with the fingers or by employing make-shift tools, pipe breakage has occurred because the insertion has not been exactly uniform around the circumference of the glass flare. The reason for pipe breakage when this insertion of the flexible insert departs even slightly from uniformity is rather obscure, although it is obvious that a gross misplacement of the insert might result in uneven forces and consequent glass breakage.

Superficially it would appear that the exact positioning of an insert of uniform thickness between inside and outside conical surfaces would be unimportant insofar as the distribution of forces thereon is concerned. However, the outside of the glass flare immediately adjacent the main body of the pipe section is not perfectly straight because a sharp line of demarcation there would greatly weaken the pipe. Accordingly a slight fillet of glass is formed in the angle between the flare and the pipe wall, and when the insert is fully inserted its inner end bears against this fillet instead of against the straight side of the flare. Therefore, if one portion of the insert is inserted even slightly further than another portion the pressure at different places on the flare will be unequal and pipe breakage may result.

An object of the invention, therefore, is to provide a new method whereby the flexible inserts employed in connecting together sections of glass pipe may be applied with certainty to a uniform depth so that force transmitted therethrough will be applied uniformly to the pipe flare to prevent leakage of the contents of the pipe without breaking the flare.

In accordance with the invention, and as a further object thereof, stresses which heretofore have caused breakage of glass pipe are avoided, in one respect, by so predistorting the above-mentioned flexible insert before the pipe sections are drawn together that the forces applied in drawing them together are distributed uniformly over the glass flares, instead of being concentrated in a small area thereof as has heretofore occurred when initially undistorted inserts have been utilized. The aforesaid predistortion of the flexible inserts is accomplished by the special tool whereby sufficient force readily may be applied to distort the insert uniformly along its circumference.

Following is a more detailed description of the invention with reference to the accompanying drawings, in which:

Fig. 1 is a vertical sectional view of apparatus embodying the invention;

Fig. 2 is an end view of the structure shown in Fig. 1;

Fig. 3 is a side elevational view, partly in section, of a pipe joint connected in accordance with the invention; and Figs. 4, 5, and 6 are enlarged fragmentary diagrammatic views useful in explaining the invention.

Referring to Fig. 1, glass pipe 10 has a flare 11 formed at the end thereof with a length and taper substantially as shown. It will be understood that a similar flare is formed on the other end of pipe section 10, not shown, so that a number of pipe sections may be connected together to form a pipe line. Coupling flange 12, preferably made of one annular piece of some suitable metal, has a body portion including an inner frusto-conical face 13 with a taper corresponding to that of glass flare 11 and with its smallest inner diameter slightly greater than the largest outer diameter of the flare in order that flange 12 may pass over one of the flares on pipe 10. Insert 14 forming a packing member likewise preferably is made of one piece of some flexible material, such as a suitable asbestos compound, but instead of having an annular shape like flange 12 insert 14 is formed in an arcuate frusto-conical shape adapted to be wrapped around flare 11 with its ends forming a narrow gap 15 shown in Fig. 3. Flange 12 and insert 14, like glass pipe 10, have been in common use for so long that they have been standardized as to dimensions and materials for various sizes of pipe.

Referring to Fig. 3 a plurality of bolts 16, or equivalent coupling means, are tightened to draw together two flanges 12 thereby applying force through two inserts 14 to draw flares 11 against gasket 17. As is well known to those skilled in the art leakage past gasket 17 more readily may be prevented by such an arrangement provided the abutting ends of pipe section 10 are smooth, straight, and perfectly parallel. In practice these conditions frequently do not exist, it being particularly difficult in many cases to have the abutting ends of pipe section 10 exactly parallel in which case, in order to prevent leakage past gasket 17, it is necessary to tighten bolts 16 to such an extent that gasket 17 is greatly over compressed on one side of the pipe with only the compression necessary to prevent leakage on the other side.

Such forces applied by bolts 16 have in the past caused much breakage of glass pipe, and attempts have been made to lessen the force required by making gasket 17 of soft material. Such attempts initially have been successful in some cases, but available soft materials are subject to cold flow which, after a short time, has caused leakage that has required further tightening of bolts 16 and consequent breakage of pipe. An object of the invention is to apply the forces from bolts 16 so uniformly along the length and about the periphery of glass flares 11 that gasket 17 may be made of a harder material that is not subject to cold flow without danger of either breakage of the pipe or leakage of its contents.

Shown more clearly in Fig. 4 a fillet 23 rounds out slightly the otherwise sharp line that would mark the intersection of flare 11 and the body of pipe 10. In practice this fillet is quite small, but it will be apparent by reference to Fig. 1 that, if the top or bottom side of insert 14 is pressed further in along flare 11, that side will transmit most of the force from flange 12 to flare 11 thus tending to break the flare, and of course if the top or bottom of the insert should be pressed still further along the straight side of pipe 10 the tendency to break the pipe would be aggravated. On the other hand, in accordance with the invention, it is possible to draw down bolts 16 carefully to press insert 14 uniformly, but it is deemed preferable to provide substantially coplanar inner and outer face portions, the outer face portion comprising a shoulder 24 on tool 20 to abut against flange 12 thereby serving as a stop to assure not only circumferentially uniform pressing of insert 14 but also to control the depth to which it is pressed.

As mentioned, the various parts usually are very accurately of the proper dimensions so that insert 14 is properly positioned when it is flush with flange 12, but if desired shoulder 24 may be undercut, as shown in Fig. 1, to press insert 14 further, or the inner face portion might be relieved somewhat to permit insert 14 to protrude slightly beyond flange 12. However, insert 14 should always be pressed far enough so that it will not bear against the adjacent members when two lengths of pipe are drawn together. An important advantage of the invention is the ease with which inserts may be pressed to a depth sufficient to assure that they will permit the full force of bolts 16 to be applied to compress gasket 17 uniformly between adjacent pipe sections.

The uniform compression of gasket 17, made possible by the uniform insertion of inserts 14 in accordance with the invention, is a matter of special importance where a long pipe line is assembled. If one gasket were compressed slightly more on one side than on the other, that would cause an angle between adjoining pipe sections which, although small, would displace the end of a single pipe section from a straight line by a substantial amount. Similar angles between successive pipe sections then might result in an intolerable departure of the pipe line from a straight line.

Referring to Fig. 5 suppose that, after flange 12 has been placed on a section of pipe 10, insert 14 is inserted between flare 11 thereof and inner face 13 of flange 12 by using only the force necessary to bend the insert around flare 11 to the position shown by dotted lines in Fig. 5. Then suppose that opposite forces, indicated by arrows in Fig. 4, are applied to pipe 10 and flange 12 to press insert 14 therebetween, as would be done by tightening bolts 16 shown in Fig. 3. Insert 14 would thereby be distorted as shown in Fig. 4, such distortion being shown greatly exaggerated however for clearness. It will be noted that the lower portion 18 of insert 14 tends to be pulled away from flare 11 and the body of pipe 10 so that force exerted by bolts 16 is transmitted to only the upper portion 19 of insert 14 and this concentrated force heretofore has caused breakage of flares 11.

It should be noted that, although the distortion of insert 14 has been shown exaggerated in Fig. 4 to illustrate the principle involved, a dangerous concentration of force at upper portion 19 may result from a very slight amount of such distortion. That this is true will be apparent when it is noted that, for a substantial concentration of force to occur at upper portion 19, it is not necessary that lower portion 18 be wholly separated from flare 11 but that partially relieving the force at lower portion 18 necessarily results in a corresponding increase in force at upper portion 19.

In accordance with the invention insert 14 is first inserted between flare 11 and inner face 13 of flange 12 approximately as shown by dotted lines in Fig. 5. Then special tool 20 having a radial flange 21 corresponding to flange 12 in size, shape, and disposition of holes therethrough so that tool 20 may be drawn toward flange 12 by bolts 16 as shown in Fig. 1, is applied. Tool 20 also has an axial cylinder 22 adapted to bear against insert 14 when bolts 16 are tightened to force the insert downward, as seen in Fig. 5, to its position shown in full lines. It will be noted that the force thus applied to insert 14 will result in its distortion shown slightly exaggerated for clearness in Fig. 5, but which, without exaggeration, results in a slight but important compression against pipe 10 of the material comprising lower portion 18.

Thereafter, when pipe 10 is coupled to another pipe section as shown in Fig. 3 thereby exerting opposite forces on pipe 10 and flange 12 as previously discussed with reference to Fig. 4, insert 14 will assume the substantially undistorted shape shown in Fig. 6 since the previous compression of material at lower portion 18 will substantially wholly offset the relieving of pressure that otherwise would occur there with the result that whatever force is applied by bolts 16 will be distributed substantially uniformly along the length of flare 11 thereby avoiding excessive stresses anywhere along the flare.

What is claimed is:

The method of joining together glass pipe sections terminating in flared ends, which comprises: positioning over each flared end a coupling member having a frustro-conical body parallel to the flared end; inserting between each flared end and each body a frustro-conical packing member; compressing each packing member by applying a tool member which engages substantially the entire outer end surface of said packing member and relatively moving towards each other said tool member and coupling member; removing the tool member; thereafter connecting together the flanged coupling members, and applying circumferentially of each flanged coupling member uniformly distributed forces to pull one pipe section against the other, said precompressed packing member uniformly distributing said last named forces to the respective flared ends of said pipe sections.

ABRAM S. BERG.
ARSENIUS N. GOREGLIAD.

REFERENCES CITED

The following references are of record in the file of this patent:

UNITED STATES PATENTS

| Number | Name | Date |
| --- | --- | --- |
| 222,615 | Webbert | Dec. 16, 1879 |
| 762,980 | Bode | June 21, 1904 |
| 787,791 | Reynolds | Apr. 18, 1905 |
| 952,602 | Candee | Mar. 22, 1910 |
| 1,434,952 | Johnson, Jr. | Nov. 7, 1922 |
| 1,866,051 | McWane | July 5, 1932 |
| 1,880,115 | Smith et al. | Sept. 27, 1932 |
| 2,355,871 | Kraft | Aug. 15, 1944 |
| 2,478,684 | Brooks | Aug. 9, 1949 |